March 24, 1942.     M. P. HOLMES     2,277,643
SPEED CONTROLLING MECHANISM
Filed Nov. 22, 1939     2 Sheets-Sheet 1
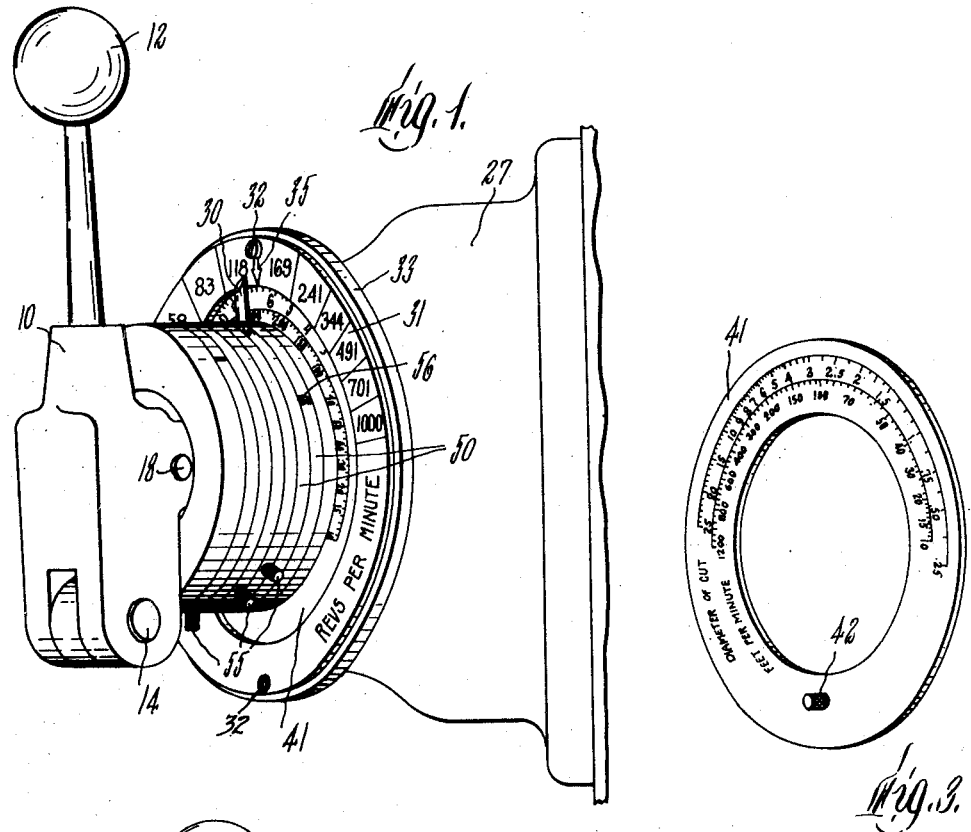
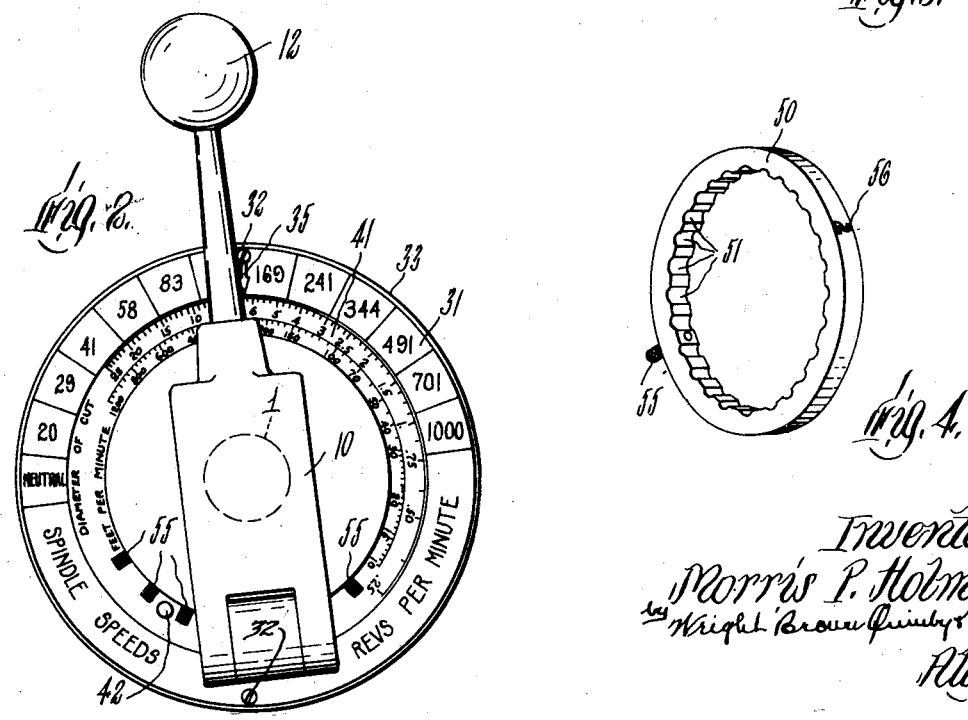
Inventor
Morris P. Holmes March 24, 1942. M. P. HOLMES 2,277,643
SPEED CONTROLLING MECHANISM
Filed Nov. 22, 1939 2 Sheets-Sheet 2
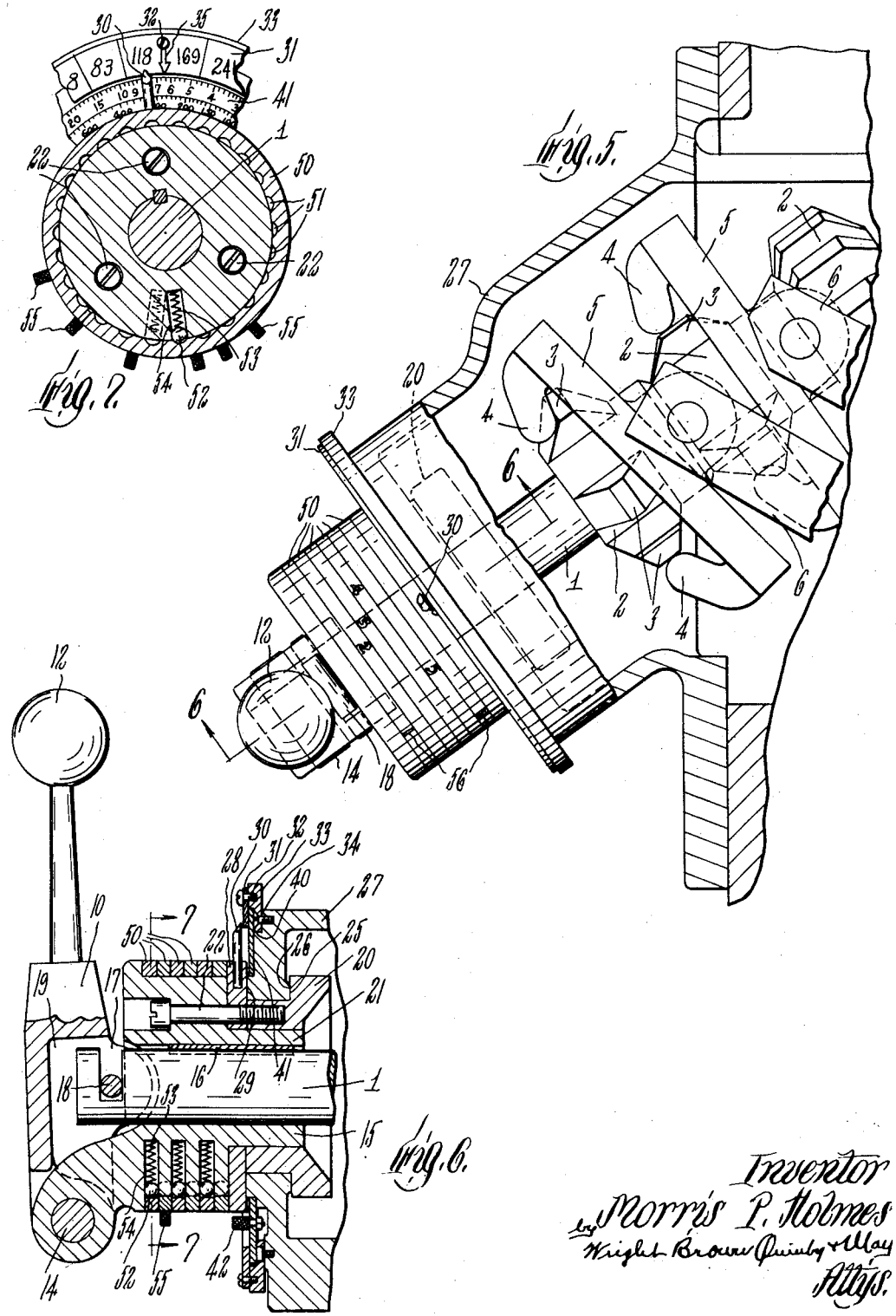
Inventor
Morris P. Holmes
Wright Brown Quinby & May
Attys.

Patented Mar. 24, 1942

2,277,643

UNITED STATES PATENT OFFICE 2,277,643

SPEED CONTROLLING MECHANISM

Morris P. Holmes, Claremont, N. H., assignor to Jones & Lamson Machine Company, Springfield, Vt., a corporation of Vermont Application November 22, 1939, Serial No. 305,662

6 Claims. (Cl. 116—124)

This invention relates to speed controlling mechanism, and has for an object to provide means by which the correct setting of the mechanism for any desired operation may be readily ascertained.

A further object is to so indicate this correct setting that the proper adjustment for any of a plurality of definite conditions may be made without the necessity of a re-determination of the proper adjustment.

As applied to a lathe, for example, the speed controlling mechanism may be employed to control the rate of rotation of the work spindle. In order to determine the proper rate of rotation for any given operation, the proper linear cutting rate for the tool and the material operated upon should be considered as one factor, and as the linear cutting rate for any rate of spindle rotation is dependent on the diameter of the work where cutting is taking place, this diameter is another factor to be taken into account in determining the proper setting of the speed controlling mechanism. In the mechanism illustrated herein employing a rockable speed selector, therefore, various cutting rates are indicated on a dial so that the desired cutting rate may be located in a definite position. Work diameter indications on this same dial are so related to the angular positions of the speed selector for the speed controlling mechanism that by adjusting this selector to bring an indicator thereon opposite to the proper diameter indication, the selector will have selected the correct speed setting for the mechanism.

Where a plurality of settings for different operations are required, as, for example, in a turret lathe where different operations are performed at the various tooling positions of the turret, an individual determination at each change of the turret may be avoided, in accordance with this invention, by setting angularly on the rockable selector an indicator for each turret position to show by appropriate indexes the proper angular position of the selector for each turret position initially determined as previously described. Thereafter for each turret position it is necessary only to turn the selector to the angular position shown by the indicator for that particular turret position.

For a more complete understanding of this invention, reference may be had to the accompanying drawings in which Figure 1 is a fragmentary side elevation of a speed controlling mechanism embodying this invention.

Figure 2 is a front end elevation of the control handle and dials of the same.

Figures 3 and 4 are perspective views of the dial ring and one of the indicating rings, respectively.

Figure 5 is a fragmentary top plan partly broken away of the mechanism.

Figure 6 is a detail section on line 6—6 of Figure 5.

Figure 7 is a detail section on line 7—7 of Figure 6.

In the drawings, this invention is shown as embodied in a gear selecting and shifting mechanism such as is illustrated in the Twamley Patent No. 1,997,841 granted April 16, 1935. In general this mechanism comprises an adjustable member shown as a selector shaft I, which, in accordance with its angular positions in a single plane, selects the gears of a gear train and then by an axial movement of the shaft adjusts the gears in the manner selected to produce a definite driving speed ratio. The shaft I is provided with a plurality of selectors 2, each having a plurality of cam elements 3 thereon with which cooperate opposite ends 4 of rockers 5, these rockers being connected as by arms 6 to gear shifting mechanism as shown in the Twamley patent. When the shaft I is located in its outer axial position, it is free to be turned to any desired angular position to present the cam elements in definite relations to the rockers 5, whereupon by pushing inwardly on the shaft I, the various cam elements properly located determine the angular positions of the rockers 5 and thereby through the arms 6 the settings of the various gears of the transmission train. In the Twamley patent, however, it will be noted that the neutral position is intermediate the ends of the arcuate path upon which the dial indications of speed are mounted, while in the mechanism shown herein the neutral position is arranged at the left hand end of the dial indications. This, however, involves only the proper angular positioning of the various controlling cam elements which can be arranged in any manner desired. Both the axial and angular positions of the shaft I are determined by the positions of the lever 10 provided with the control handle 12.

This lever 10 is shown as fulcrumed at 14 to a sleeve 15 within which the shaft I is keyed for sliding but non-rotative motion as by the key 16. The outer end of the shaft I is shown as provided with a slot 17 in which rides a pin 18 joining opposite sides of a recess 19 of the lever 10 into which recess the outer end of the shaft 1 extends. The sleeve 15 is held against axial motion with the shaft 1, but through its keyed connection thereto, rocking of this sleeve also rocks the shaft 1. In order to retain the sleeve against axial motion with the shaft, it has mounted on a reduced diameter portion 21 a retaining collar 20, the sleeve and collar being secured together as by screws 22. The part 20 is provided with a shoulder 25 which engages on the inner face 26 of a casing member 27 which encloses the outer portion of the mechanism. A ring member 28 engages the opposite face 29 of the casing 27 and is held between the parts 20 and 21 to turn therewith by the screws 22. The ring 28 is shown as provided with a pointer 30 which is arranged to cooperate with a scale 31 secured as by screws 32 to a ring 33 secured in an annular recess 34 in the casing part 27. The scale 31 is thus fixed to the casing 27 while the pointer 30 is movable with the sleeve 15, and consequently with the shaft 1, relative to the scale 31. This scale 31 may have indicated thereon the number of revolutions per minute of the driven shaft, assuming a constant predetermined drive speed, and with the settings of the change gears selected by the corresponding angular position of the shaft 1. As shown in Figure 7 this scale 31 also carries a fixed indicating marking at 35.

The ring 33 is provided with an annular recess 40, the base of which may be in substantial registry with the outer face of the casing 27 adjacent thereto, for the reception of an annular dial 41, which is angularly adjustable about the axis of the shaft 1. This dial may be provided at any suitable place with an outwardly projecting handle portion 42, by which it may be angularly adjusted.

Along the inner edge of a portion of this dial 41 are indications of one of the factors which needs to be considered in determining the proper adjustment of the shaft 1 for correct speed selection. Where this mechanism is used for adjusting the speed of rotation of a work-carrying spindle of a lathe, or the like, this factor may be linear cutting speed of the tool designated in feet per minute. Proper cutting speeds in feet per minute vary with the various materials being operated upon with any given type of tool, so that a proper selection of this cutting speed is important in determining the proper speed selection. The selection of the proper linear cutting speed having been made, the dial 41 is turned to bring this selected cutting speed opposite to the fixed indicator 35. Since the linear cutting speed for any given speed of rotation of the spindle is dependent upon the diameter of the work where cutting is being effected, this work diameter is another factor which must be taken into account. Along the outer edge of the dial 41, therefore, are indicated work diameters. These indications of work diameter are so related to the indications of linear cutting speed, and the angular positions of the shaft 1 for speed selection, that when the pointer 30 is turned to the proper work diameter indication by turning the handle 12 about the axis of the shaft 1, the dial having been set to indicate the desired linear cutting speed, the shaft 1 is in the proper angular position to select the spindle speed which will produce the selected linear cutting speed on work of the selected diameter. Thus to determine the proper setting of the selectors 2, the dial 41 is adjusted to bring the desired linear speed indication to a predetermined point (the marker 35), whereupon the handle 12 is turned to move the shaft 1 to an angular position corresponding to the proper work diameter. When this has been done, it is only necessary to move the shaft axially to position the gear change mechanism as selected, so that the spindle is driven at the proper speed for the particular conditions of work diameter and linear cutting speed which have been determined.

In many cases, however, there are several operations to be performed by the same machine in connection with which the diameter of the work operated upon, or the proper linear cutting speed, or both, may be different one from another. For example, a turret lathe may perform several operations in sequence upon the work, depending upon the various operations which it is desired to perform, and each of these may have its own particular conditions of work diameter and proper linear cutting speed. In order that the speed mechanism may be adjusted quickly to the proper positions for each of the operative stations of the turret without requiring an adjustment of the dial 41 or the pointer 30 with respect to the dial, or both, in each case, provision is made, in accordance with this invention, for showing directly the proper setting of the selecting member for each turret station, as determined by an initial setting of the dial and the handle 12 for each of these stations. To this end there may be mounted for angular adjustment at any convenient position with respect to the shaft 1, as on the outer face of the sleeve 15, a plurality of ring elements 50, there being one such element for each of the turret positions, and each being individually angularly adjustable about the axis of the shaft. These rings 50 may be mounted side by side, and in view of the nature of the particular speed controlling mechanism shown herein in which the various angular selecting positions of the shaft 1 are spaced by definite angular increments, the rings 50 may be similarly mounted for adjustment by corresponding angular increments. To this end each of the rings 50, as shown in Figure 7, may be provided with internal notches 51 in which may engage a spring latch such as the ball 52 outwardly spring pressed by the spring 53 seated in a socket 54 in the sleeve 15, there being one such latch element for each of the rings 50. Each ring 50 may also have secured thereto at any convenient point an actuating handle element 55, as shown best in Figure 4, by which it may be angularly adjusted. Each of these rings may have an index element thereon, such as a numeral at 56 indicating one of the turret positions. For example, as shown, six rings 50 are provided, one being provided for each of six turret positions and these rings may be numbered in sequence from 1 to 6. The proper setting of the shaft 1 for accomplishing the work at each turret position is determined initially by adjustment of the dial ring 41, and adjustment of the shaft 1 with relation to the dial ring, and the corresponding ring 50 is then adjusted angularly so as to bring its indicating member 56 into a predetermined position, for example, in a position directly beneath the indicator 35. After these rings 50 have once been set, therefore, it is only necessary, in order to insure correct selection of the speeds for the various turret positions, to turn the handle 12 to that angular position where the ring member corresponding to the turret position is directly beneath the indicator 35. Thus, after the proper selection has been initially determined and the corresponding ring 50 has been correspondingly angularly adjusted, it is only necessary for the operator to adjust the handle 12 to the position indicated by the corresponding ring member 50 to insure proper adjustment of the speed controlling mechanism for that particular turret position.

Assume, for example, that at one of the turret positions it is desired to use a cutting speed of 320 feet per minute turning a bronze work piece at 8 inch diameter and with a particular turning tool. The dial 41 is then turned to the position shown in Figure 7 where the 320 indication on its lower edge is positioned beneath the indicator 35. The handle 12 while in its outer selecting position is then turned to bring the pointer 30 opposite to the indication 8 (the work diameter at the cut) at the outer margin of the dial 41. This indicator 30 then indicates a setting of the speed control mechanism selecting 118 revolutions per minute, and by pressing the handle 12 inwardly the selectors 2 condition the mechanism to produce that rate of rotation. The ring 50 corresponding to this turret position is then angularly adjusted to bring its index mark opposite to the indicator 35 and is left in this adjusted position. The ring 50 indicating the second turret position is shown so adjusted in Figure 5. Thereafter whenever the second turret position for that particular job is reached in any subsequent cycle, it is only necessary for the operator to turn the selecting handle to bring the No. 2 ring 50 into the same angular position to select the proper speed without requiring any resetting of the dial 41 and the pointer 30 with reference to this dial 41. Of course, if this particular operation were to be performed at the first turret position, the correspondingly numbered ring 50 rather than that for the second turret position would have been adjusted as just described. Similarly the proper angular setting of the selector for each turret position to give the described cutting speed for the particular operation such as turning, drilling, reaming, threading, etc. and with reference to the particular tool used, at the particular work diameter to be operated upon, may be determined by setting the dial 41 and the pointer 30, and then the corresponding ring 50 for that turret position is set according to the position determined by the relative settings of the dial 41 and the pointer 30. After all the rings 50 have once been correctly set for a specific piece of work, the setting of the selector may be made immediately from the corresponding ring 50 without requiring the individual adjusting of the dial 41 and the pointer 30 with reference thereto for each turret position.

From the foregoing description of an embodiment of this invention, it should be evident to those skilled in the art that various changes and modifications might be made without departing from the spirit or scope of this invention as defined by the appended claims.

I claim:

1. The combination with a speed selecting mechanism comprising a single adjustable member determining by its position of adjustment in a single plane the speed selection of said mechanism, of an element adjustable relative to said member in accordance with one speed determining factor for indicating in accordance with another speed determining factor shown thereon the proper setting of said member in said plane to select a speed proper for both factors.

2. The combination with a speed selecting mechanism comprising an adjustable member determining by its position of adjustment the speed selection of said mechanism, of an element adjustable relative to said member in accordance with one speed determining factor for indicating in accordance with another speed determining factor shown thereon the proper setting of said member to select a speed proper for both factors, and parts adjustable relative to said member and movable therewith for indicating the proper setting of said member for selected combinations of said factors.

3. The combination with a mechanism for selecting the speed of rotation of a lathe spindle, said mechanism including a single member rockable to select such speed, of a dial adjustable about the axis of said member, said dial having arranged thereon a table of linear cutting speeds, an index to which any selected linear cutting speed indication on said dial may be brought into registry, and work diameter indications on said dial so related to said cutting speed indications and the spindle speed selecting positions of said rockable member that when said member is angularly adjusted to bring a part thereon into registry with a selected work diameter indication, the speed selection by said member will produce the selected cutting speed on work of the diameter selected.

4. The combination with a mechanism for selecting the speed of rotation of a turret lathe spindle, said mechanism including a member rockable to select such speed, of a dial adjustable about the axis of said member, said dial having arranged thereon a table of linear cutting speeds, an index to which any selected cutting speed indication on said dial may be brought into registry, said dial also carrying work diameter indications so related to said cutting speed indications and the angular positions of said member that when said member is adjusted to bring a part thereof into registry with a selected diameter indication, the speed selected by said member will produce the selected cutting speed on work of the diameter selected, and a plurality of elements movable with said member, there being one of said elements for each operative turret position, each of said elements being adjustable relative to said member to bring a selected part thereof into a predetermined position when said member is in the proper angular position to select a speed suitable for the tooling operation at the corresponding turret position to produce the desired linear cutting speed.

5. The combination with a mechanism for selecting the speed of rotation of a spindle for producing a cut in circular work, said mechanism including a shaft rockable to select said speed, a collar keyed to said shaft, an arcuate stationary guideway concentric with said shaft, a dial element adjustable in said guideway about said axis, said dial having indicated thereon adjacent to one edge linear cutting speeds, a stationary indicator in cooperation with which any selected of said indications may be presented by moving said dial in said guideway, said dial having indicated thereon adjacent to its opposite edge diameters of work, and a pointer carried by said collar for cooperation with said dial element, said diameter indications being so related to said cutting speed indications and the speed selections of said shaft that when said pointer indicates a selected diameter and said indicator is presented to a specific cutting speed, the speed selected by said shaft will produce said specific cutting speed on work of the selected diameter.

6. The combination with a mechanism for selecting the speed of rotation of a spindle for producing a cut in circular work, said mechanism including a shaft rockable to select said speed, a collar keyed to said shaft, an arcuate stationary guideway concentric with said shaft, a dial element adjustable in said guideway about said axis, said dial having indicated thereon adjacent to one edge linear cutting speeds, a stationary indicator in cooperation with which any selected of said indications may be presented by moving said dial in said guideway, said dial having indicated thereon adjacent to its opposite edge diameters of work, and a pointer carried by said collar for cooperation with said dial element, said diameter indications being so related to said cutting speed indications and the speed selections of said shaft that when said pointer indicates a selected diameter and said indicator is presented to a specific cutting speed, the speed selected by said shaft will produce said specific cutting speed on work of the selected diameter, said collar having mounted for angular adjustment thereon about its axis elements each having a part thereof assuming a predetermined position when said shaft has been set to produce a desired cutting speed on a predetermined diameter of work and thereby indicate a correct setting of said shaft for a selected operation after such correct setting has been determined.

MORRIS P. HOLMES.